(No Model.) 2 Sheets—Sheet 1.
A. E. CAREY & E. LATHAM.
MACHINE FOR MAKING CONCRETE, &c.
No. 409,560. Patented Aug. 20, 1889.
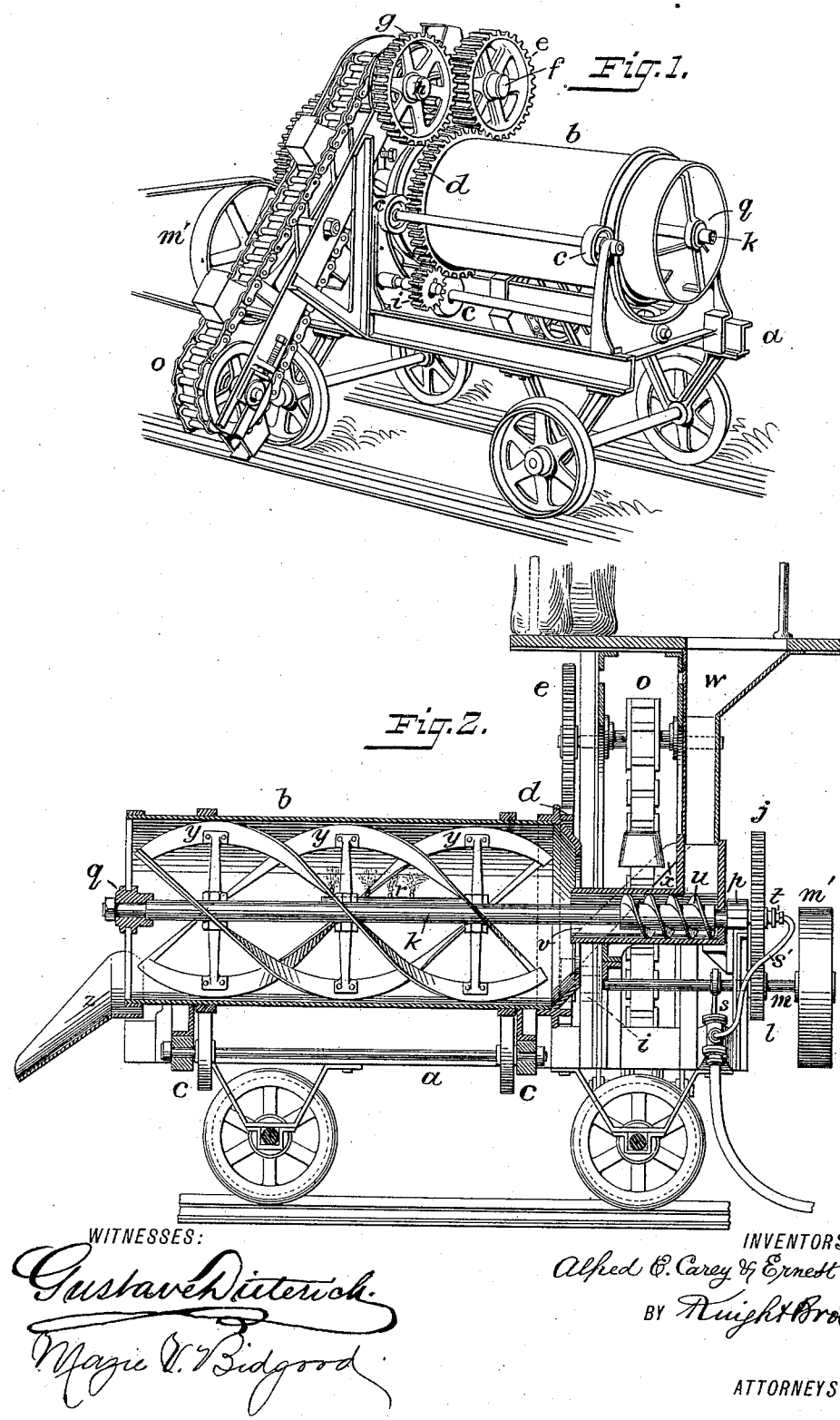

(No Model.) 2 Sheets—Sheet 2.
A. E. CAREY & E. LATHAM.
MACHINE FOR MAKING CONCRETE, &c.
No. 409,560. Patented Aug. 20, 1889.
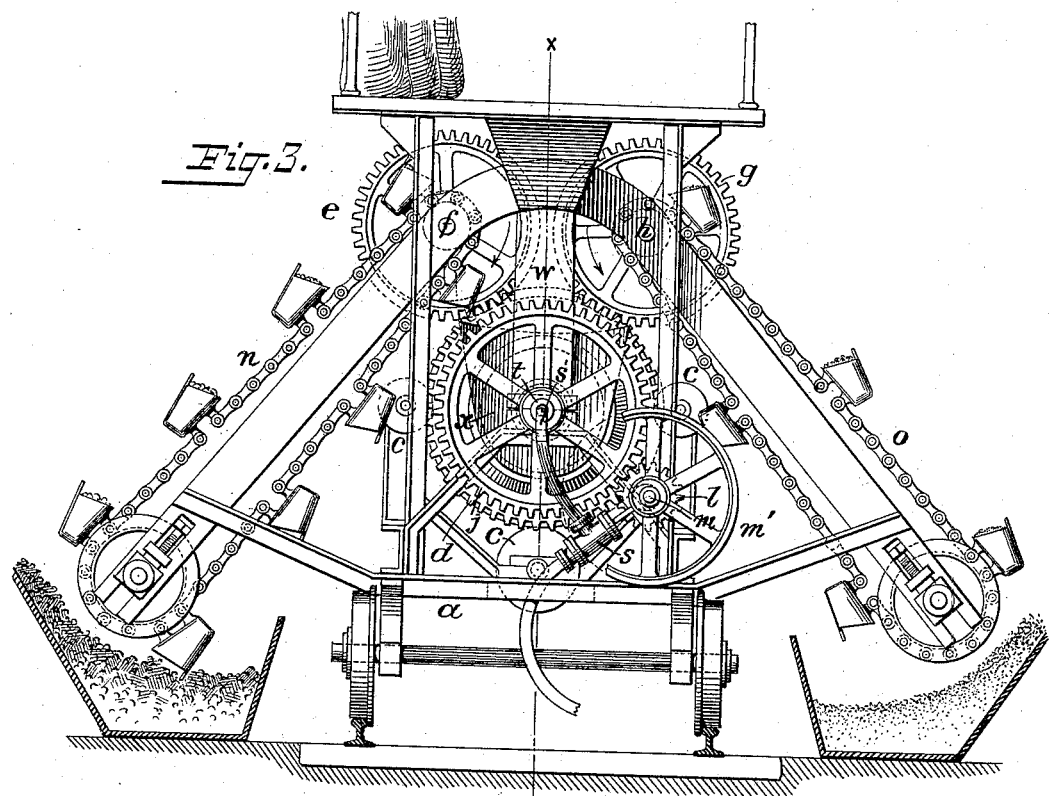
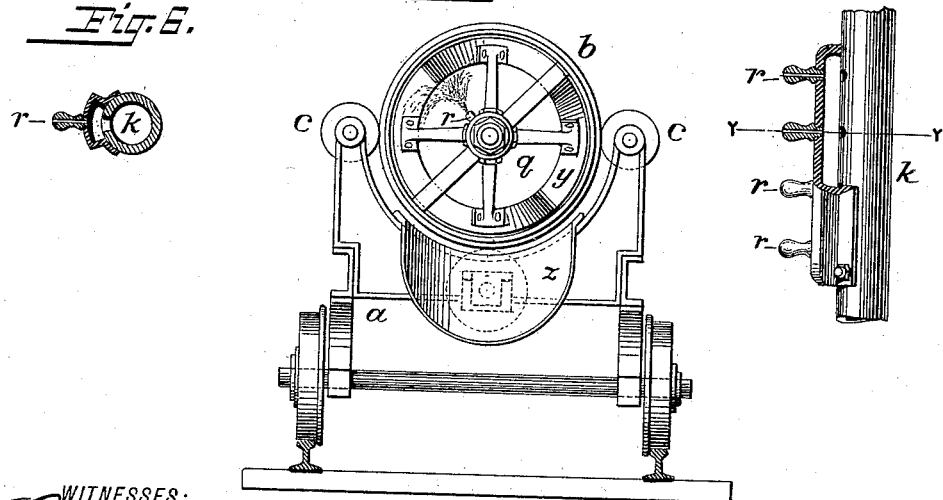
WITNESSES:
Gustave Dieterich
Mazie V. Bidgood
INVENTORS
Alfred E. Carey & Ernest Latham
BY Knight Bros.
ATTORNEYS
N. PETERS, Photo-Lithographer, Washington, D. C.

UNITED STATES PATENT OFFICE.

ALFRED E. CAREY, OF WESTMINSTER, AND ERNEST LATHAM, OF LONDON, COUNTY OF MIDDLESEX, ENGLAND.

MACHINE FOR MAKING CONCRETE, &c.

SPECIFICATION forming part of Letters Patent No. 409,560, dated August 20, 1889.

Application filed June 28, 1889. Serial No. 315,864. (No model.) Patented in England October 25, 1884, No. 14,115.

*To all whom it may concern:*

Be it known that we, ALFRED E. CAREY, of Westminster, county of Middlesex, England, and ERNEST LATHAM, of London, county of Middlesex, England, subjects of the Queen of Great Britain, have jointly invented a new and useful Improvement in Machines for Making Concrete, &c., (which is described in English patent to us, No. 14,115, bearing date October 25, 1884,) of which improvement the following is a specification.

Our invention relates to machinery for making or producing concrete, cement, or mortar by continuous operation, in any desired quantities and of any desired ingredients, thoroughly mixed in a short space of time.

Under our present invention we effect the manufacture or producing of concrete, cement, or mortar by a single and gradual mixing of the required materials, which is partly done while the materials are dry and continued after the addition of water. The water is introduced to the cylinder by the hollow shaft hereinafter described, and which serves to carry scrapers and is fitted with a gland-connection to water-supply at one end. The hollow shaft is fitted with side plugs at intervals in its length, any one or more of which may be removed, according to the point at which it is desired to introduce the water, and any kind of nozzle may be introduced in its place to suit circumstances or variety of material.

The working machinery comprises means for measuring and feeding the several ingredients, combined with a rotating mixing-cylinder having moving scrapers therein.

The apparatus for feeding cement to the mixing-cylinder consists of a hopper or chute and a worm, (which may be a taper worm or a worm of varying pitch,) having rotary motion imparted and arranged to slide endwise in bearings, when required; or the hopper or chute over the worm may be adjustable, or the speed of the worm varied. By this means the quantity of cement fed to the mixing-cylinder may be readily adjusted by varying the relative positions of the worm and hopper by the use of speed-wheels. The pocket or measuring-wheels, chain, and buckets, or other elevator and measurer, may be of any usual or suitable construction, and are arranged to deliver the required quantities of material to the measuring-cylinder.

The mixing-cylinder is carried on rollers, and is fitted internally with a shaft to which scrapers are secured. The shaft may be so geared with the cylinder as to rotate either in the same or in reverse direction to the cylinder, but at a different speed when rotating in the same direction. The said cylinder may be carried loose on the internal shaft of the scrapers, instead of on external rollers.

The mixing-cylinder may be inclined, with scrapers parallel to its axis; or it may be horizontal, with scrapers at an angle to its axis, so as to serve to propel the materials along the cylinder. Any convenient motor is employed, and the worm-feed, pocket-wheels, and cylinder may be driven therefrom by means of any suitable gearing.

When concrete is being made, the measuring provisions apply to three materials, or more if required, and when mortar is being made to two materials only. The pocket-wheels or other measuring-elevators take up and deliver measured quantities of sand and stones to the mixing-cylinder and the screw-feed delivers cement or lime thereto as required.

Referring to the accompanying drawings, which form a part of this specification, Figure 1 is a general perspective view of a cement-making machine embodying my invention. Fig. 2 is a longitudinal section of the same on the line X X. Fig. 3 is an end elevation of the sand and ballast feeding appliances. Fig. 4 is an end view of the mixing-cylinder. Fig. 5 represents a portion of the tubular shaft with its mechanism. Fig. 6 is a cross-section of the same on the line Y Y.

$a$ represents a wheeled carrying-frame of the machine.

$b$ is a mixing-cylinder carried on rollers $c$.

$d$ is a toothed ring secured to the mixing-cylinder. Gearing with $d$ is a toothed wheel $e$ on the shaft $f$. The said wheel $e$ is also in gear with the wheel $g$ on one end of the shaft $h$. The wheel $j$ is in gear with the pinion $l$ on the driving-shaft $m$, carrying driving-pulley $m'$. The shaft $m$ carries a pinion $i$, which, gearing in the spur-wheel $d$, rotates the cylinder.

On the shaft $f$ is a pulley which gives motion to the endless chain of buckets $n$. On the shaft $h$ is a pulley which gives motion to the endless chain of buckets $o$. The shaft $k$ is hollow, and is carried in bearings $p$, fixed to the frame $a$ and $q$, attached to the mixing-cylinder $b$. Nozzles $r$ on the shaft $k$ communicate from the interior of the shaft into the cylinder at about mid-length of the latter, several interchangeable sets of different-sized nozzles enabling the outflow of the water to be adjusted accurately.

$s$ is a pump driven from the shaft $m$ for the purpose of supplying water to the interior of the shaft $k$, and thence to the mixing-cylinder. The feed-pipe $S'$ of the pump $s$ (or if no pump a pipe under pressure from a main or tank and with means for regulating the water) passes through a gland $t$ on the end of the shaft $k$.

$u$ is a worm working in the channel $v$ and carried by the shaft $k$. The said worm may be attached to and revolve with the shaft $k$, or it may be loose thereon and be driven by belt or other gear.

$w$ is a hopper on the upper part of the channel-case.

$x$ is a chute leading from the sand and ballast buckets to the mixing-cylinder. This chute is forked, with one limb on each side of the channel-case $v$.

$y$ are helical-shaped blades fitting close to the internal surface of the mixing-cylinder and attached by arms to the shaft $k$.

$z$ is the delivery-chute.

When the machinery is to be put to use, larger or smaller nozzles are to be applied at the point where it is desired that the water should be mixed with the concrete, and the suction-pipe of the pump $s$ is connected to a suitable water-supply. The hopper $w$ is slid along the case $v$ until it is over that portion of the screw which will give the required feed to the cement, and sand-ballast and cement are supplied to the endless chain of buckets $n$ and $o$ and to the hopper $w$ as fast as the buckets and worm can remove them. The proportion of sand can be varied, if required, by partially filling the sand-buckets with wood or by allowing cement to set in them. As the various moving parts are geared together and driven from the driving-shaft $m$ the sand, ballast, and cement are delivered through the chutes $x$ and channel $v$ into the mixing-cylinder $b$ in measured quantities at uniform speed. It will be seen on examination of the gearing (the direction of whose motion is shown by the arrows) that the cylinder $b$ and blade $y$ rotate in opposite directions. The blades $y$ are helical in outline and lift the materials from the bottom of the cylinder and allow them to slide forward to another portion of the bottom of the cylinder and so to become better and better mixed as they pass through it. When completely mixed and ready for use, the now thoroughly blended and tempered concrete is delivered down the chute $z$.

It will be obvious that the cylinder might be inclined instead of being horizontal; but we prefer the arrangement shown.

Having thus described our invention, the following is what we claim as new therein and desire to secure by Letters Patent:

In a machine for the automatic manufacture of concrete or mortar, the combination, with suitable separate hoppers or receptacles for the several ingredients, (such as sand, stones, or broken rock and dry cement or lime,) of the several coacting conveying and measuring devices, a revolving cylinder which receives said ingredients, and independently revolved mixing and forwarding blades within said cylinder, said blades being mounted on a hollow shaft having water-tight connection with a water-supply pipe, and having discharge-orifices midway of said cylinder, whereby the ingredients, having been first intimately mingled in the dry condition, are then at one continuous operation mixed and tempered into a wet or pasty mass in condition for use.

ALFRED E. CAREY.
ERNEST LATHAM.

Witnesses to the signature of A. E. Carey:
N. W. CURTIS,
THOS. W. WELLSTED.

Witnesses to the signature of E. Latham:
FRANCIS W. FRIGOUT,
H. H. NEWMAN.